(12) United States Patent
Sakaguchi

(10) Patent No.: US 10,122,305 B2
(45) Date of Patent: Nov. 6, 2018

(54) MOTOR CONTROL APPARATUS

(71) Applicant: DENSO CORPORATION, Kariya, Aichi-pref. (JP)

(72) Inventor: Koji Sakaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/552,631

(22) PCT Filed: Feb. 18, 2016

(86) PCT No.: PCT/JP2016/000846
§ 371 (c)(1),
(2) Date: Aug. 22, 2017

(87) PCT Pub. No.: WO2016/136205
PCT Pub. Date: Sep. 1, 2016

(65) Prior Publication Data
US 2018/0054143 A1 Feb. 22, 2018

(30) Foreign Application Priority Data
Feb. 25, 2015 (JP) .................................. 2015-035186

(51) Int. Cl.
*H02K 3/00* (2006.01)
*H02P 6/24* (2006.01)
(Continued)

(52) U.S. Cl.
CPC ................ *H02P 6/16* (2013.01); *H02P 1/163* (2013.01); *H02P 25/08* (2013.01); *H02P 25/0925* (2016.02)

(58) Field of Classification Search
CPC .......... H02P 25/08; H02P 6/16; H02P 25/092; H02P 25/0925
See application file for complete search history.

(56) References Cited

U.S. PATENT DOCUMENTS

2003/0222617 A1 12/2003 Nakai et al.
2004/0195496 A1* 10/2004 Amamiya .............. G01D 5/342
250/231.13
(Continued)

FOREIGN PATENT DOCUMENTS

JP 2000-69779 3/2000

OTHER PUBLICATIONS

International Search Report for PCT/JP2016/000846, dated May 24, 2016, 3 pages.

*Primary Examiner* — Bickey Dhakal
*Assistant Examiner* — Charles S Laughlin
(74) *Attorney, Agent, or Firm* — Nixon & Vanderhye PC

(57) ABSTRACT

A motor control apparatus which is applied to an actuator provided with a motor and an encoder, and drives the motor is provided. The motor control apparatus comprises: a controller that learns an initial position of a rotor, and also decides an energized phase; and a drive circuit that performs switching operation to energize an energized phase. The controller learns that, in learning the initial position, the initial position of the rotor is a two-phase facing position in which two adjacent salient poles of the rotor face salient poles of two energized phases of a stator, and the initial position of the rotor is a one-phase facing position in which one salient pole of the rotor faces a salient pole of one non-energized phase of the stator.

5 Claims, 12 Drawing Sheets

(51) Int. Cl.
*H02P 23/20* (2016.01)
*H02P 6/16* (2016.01)
*H02P 25/08* (2016.01)
*H02P 1/16* (2006.01)
*H02P 25/092* (2016.01)

(56) References Cited

U.S. PATENT DOCUMENTS

| | | |
|---|---|---|
| 2006/0033464 A1 | 2/2006 | Nakai et al. |
| 2006/0197489 A1 | 9/2006 | Nakai et al. |
| 2007/0182353 A1 | 8/2007 | Kamio et al. |
| 2009/0108791 A1 | 4/2009 | Isobe et al. |
| 2009/0193923 A1 | 8/2009 | Nakai et al. |
| 2011/0068730 A1 | 3/2011 | Nakai et al. |
| 2013/0200826 A1* | 8/2013 | Yoshida .............. H02P 6/205 318/400.11 |

* cited by examiner

MOTOR CONTROL APPARATUS

CROSS-REFERENCE TO RELATED APPLICATION

This application is the U.S. national phase of International Application No. PCT/JP2016/000846 filed Feb. 18, 2016, which designated the U.S. and claims priority to Japanese Patent Application No. 2015-35186 filed on Feb. 25, 2015, the entire contents of each of which are hereby disclosure of which is incorporated herein by reference.

TECHNICAL FIELD

The present disclosure relates to a motor control apparatus that sequentially switches an energized phase of a motor on the basis of output signals of an encoder to rotationally drive a rotor.

BACKGROUND ART

As for a control device for driving a motor such as a switched reluctance motor, there is known a motor control apparatus that counts pulse signals outputted by an encoder in synchronization with rotation of a rotor, detects a rotational position of the rotor on the basis of the count values, and sequentially switches an energized phase, to rotationally drive the rotor.

This kind of motor can only detect an amount of rotation (angle of rotation) from an activated position of the rotor on the basis of count values of output signals of the encoder after activation. Thus, the motor needs to learn an absolute initial position of the rotor in some way at the start of activation and decide the correspondence between the rotational position of the rotor and the energized phase.

For example, in a method for aligning an angle sensor of a switched reluctance motor disclosed in Patent Literature 1, two phases are simultaneously energized at the start of activation, and the rotational position of the rotor after the lapse of a predetermined time is set as a reference, to decide the energized phase.

PRIOR ART LITERATURES

Patent Literature

Patent Literature 1: JP 2000-69779 A

SUMMARY OF INVENTION

According to Patent Literature 1, it is assumed that, when a stop position of the rotor is at an unstable equilibrium point, the rotor does not move at all from that position when simultaneous energization of the two phases is performed during the activation. Hence in a "first embodiment", two-stage drive is performed where one phase is first energized and two phases are then energized. Further, in a "second embodiment", a product is assembled by pressing a rotor shaft with a spring so as not to prevent the rotor from stopping at the unstable equilibrium point.

The two-stage drive method disclosed in Patent Literature 1 requires the time for initial drive. Further, the method of devising the product assembly by using the spring or the like can limit the applicability depending on the product.

It is an object of the present disclosure to provide a motor control apparatus that easily learns an initial position of a rotor at the start of activation without two-stage drive or devised product assembly.

According to one aspect of the present disclosure, a motor control apparatus is applied to an actuator provided with a motor and an encoder, and drives the motor. The motor includes a stator having a plurality of salient poles, wound with three-phase windings, on an inner periphery, and a rotor having a plurality of salient poles on an outer periphery. The encoder outputs, at a predetermined angle interval, an A-phase signal and a B-phase signal that take either Hi or Lo accompanied by rotation of the rotor. The motor control apparatus comprises: a controller that learns an initial position of the rotor based on the A-phase signal and the B-phase signal acquired from the encoder in a state where two-phases out of three phases have been energized during initial drive after power-on, and also decides an energized phase based on a rotational position of the rotor during normal drive after the initial drive; and a drive circuit that performs switching operation to energize the energized phase, which is decided by the controller. The controller learns that, in learning the initial position, the initial position of the rotor is a two-phase facing position in which two adjacent salient poles of the rotor face salient poles of two energized phases of the stator when values of the A-phase signal and the B-phase signal are in a first state of both being Hi or both being Lo, and the initial position of the rotor is a one-phase facing position in which one salient pole of the rotor faces a salient pole of one non-energized phase of the stator when the values of the A-phase signal and the B-phase signal are in a second state of both being Hi or both being Lo.

According to the present disclosure, it may be possible to learn that the initial position of the rotor is the two-phase facing position or the one-phase facing position based on values of the A-phase signal and the B-phase signal at the time of energizing two phases out of three phases. Hence it may be possible to easily learn the initial position of the rotor at the start of activation without two-stage drive or devised product assembly.

Further, in the present disclosure, since two phases out of the three phases are energized in learning the initial position, it may be possible to learn the initial position even when one phase is disconnected.

BRIEF DESCRIPTION OF DRAWINGS

The above and other aspects, features and advantages of the present disclosure will become more apparent from the following detailed description made with reference to the accompanying drawings. In the drawings.

DESCRIPTION OF EMBODIMENTS

Hereinafter, a motor control apparatus according to one embodiment of the present disclosure will be described with reference to the drawings.

Embodiment

With reference to FIGS. 1 to 6, descriptions are given of the motor control apparatus according to one embodiment of the present disclosure, and a range switching apparatus for an automatic transmission, to which the motor control apparatus is applied.

An overall configuration of a range switching apparatus 10 is described with reference to FIGS. 1 and 2. The range switching apparatus 10 corresponds to one example of the actuator.

Figure 1:
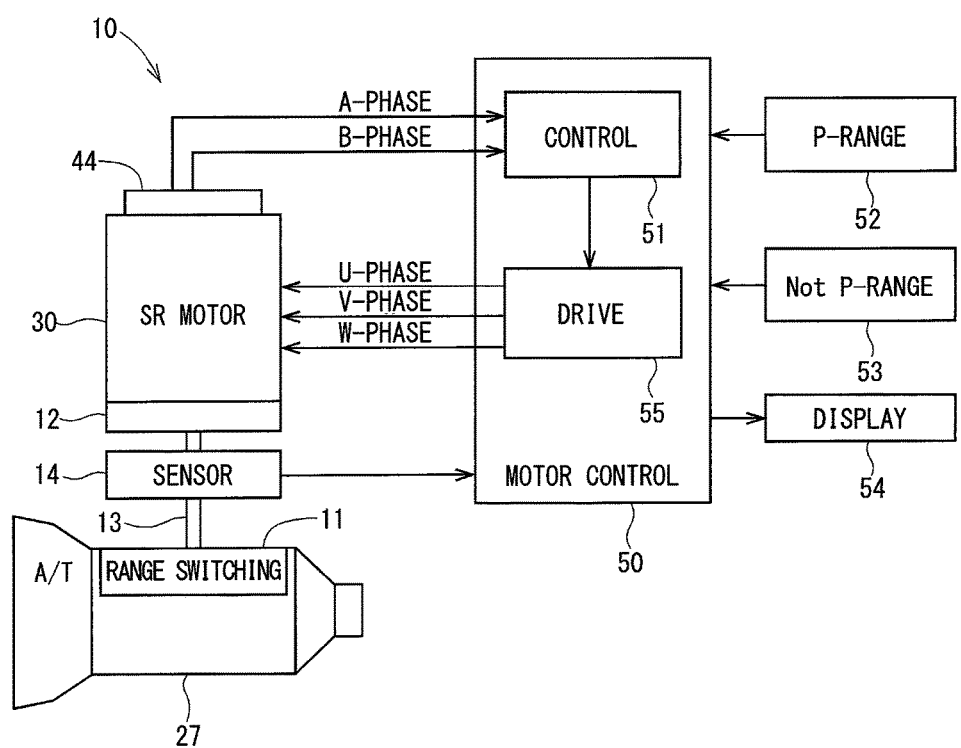
FIG. 1 is an overall configuration diagram of a range switching apparatus to which a motor control apparatus according to one embodiment of the present disclosure is applied.
Figure 2:
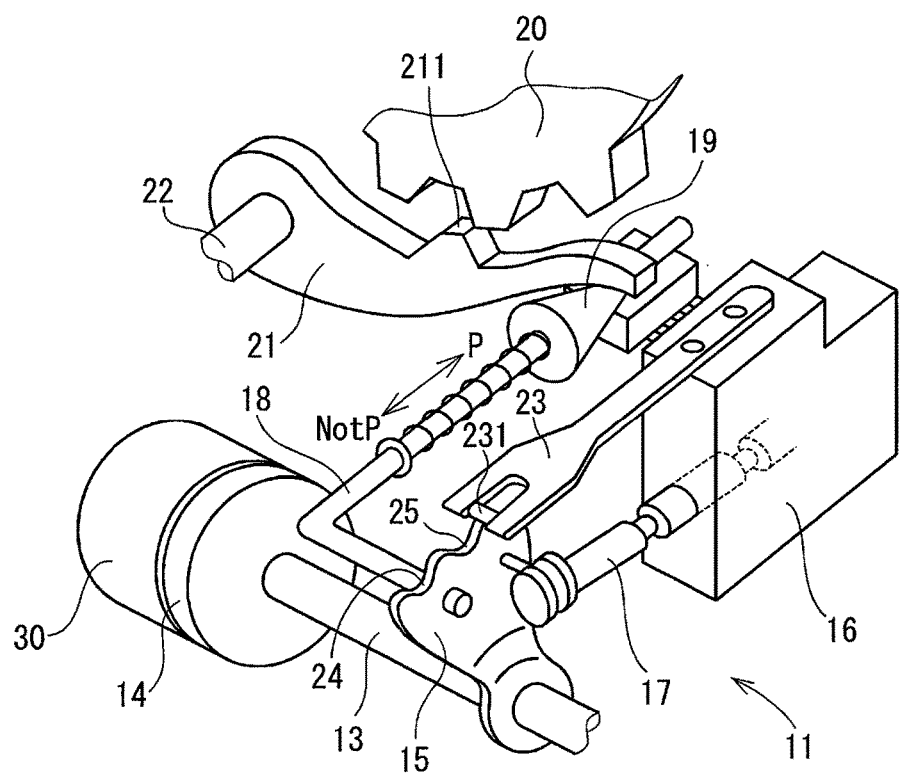
FIG. 2 is a perspective view of the range switching apparatus.

As shown in FIG. 1, the range switching apparatus 10 includes a motor 30 that is a drive source for a range switching mechanism 11, and an encoder 44 that detects a rotor rotational position of the motor 30. The motor 30 is configured of, for example, a switched reluctance motor (hereinafter referred to as SR motor) and has a deceleration mechanism 12 built therein.

An output shaft sensor 14 is provided to an output shaft 13 connected to the deceleration mechanism 12 of the SR motor 30. The output shaft sensor 14 is configured of, for example, a potentiometer and detects an angle of rotation of the output shaft 13. Based on the angle of rotation of the SR motor 30, the angle being detected by the output shaft sensor 14, it may be possible to confirm the current range of an automatic transmission 27.

A motor control apparatus 50 includes a controller 51 and a drive circuit 55.

The controller 51 counts rising and falling edges of an A-phase signal and a B-phase signal outputted from the encoder 44. In accordance with the count values, the controller 51 decides an energized phase, with which the SR motor 30 is energized from the drive circuit 55, and makes an instruction to the drive circuit 55.

The drive circuit 55 performs switching operation based on the instruction from the controller 51, to supply the SR motor 30 with alternating current (AC) power for three phases which are a U-phase, a V-phase, and a W-phase.

At this point, a configuration of the range switching mechanism 11 is described with reference to FIG. 2.

A detent lever 15 is fixed to the output shaft 13. A spool valve 17 of a manual valve 16 is connected to the detent lever 15. When the SR motor 30 rotates the detent lever 15, a position of the spool valve 17 of the manual valve 16 is switched accordingly.

A parking rod 18 having an L-shape is fixed to the detent lever 15. A cone 19 provided on the end of the parking rod 18 is in contact with a lock lever 21. The lock lever 21 vertically moves with a shaft 22 at the center in accordance with the position of the cone 19, to lock/unlock a parking gear 20. The parking gear 20 is provided on an output shaft of the automatic transmission 27. When the parking gear 20 is locked by the lock lever 21, drive wheels of a vehicle is held in a parking state of being stopped from rotation.

A detent spring 23 is fixed to the manual valve 16, the spring serving to hold the detent lever 15 in a parking range (hereinafter referred to as "P-range" and in another range (hereinafter referred to as "Not P-range"). When an engagement part 231 provided on the end of the detent spring 23 is fitted into a recess 24 of the detent lever 15, the detent lever 15 is held in the P-range position. When the engagement part 231 is fitted into a recess 25 of the detent lever 15, the detent lever 15 is held in the Not P-range position.

In the P-range, the parking rod 18 moves in a direction of approaching the lock lever 21, and a thick portion of the cone 19 presses up the lock lever 21. A projection 211 of the lock lever 21 is then fitted into the parking gear 20 to come into the state of locking the parking gear 20. As a result, the output shaft (drive wheels) of the automatic transmission 27 is locked and held in the parking state.

In the Not P-range, the parking rod 18 moves in a direction of leaving the lock lever 21, and the thick portion of the cone 19 moves out of the lock lever 21 to lower the lock lever 21. Then, the projection 211 of the lock lever 21 comes off the parking gear 20 to unlock the parking gear 20. As a result, the output shaft of the automatic transmission 27 is rotatable and is held in a travel possible state.

Returning to FIG. 1, the motor control apparatus 50 receives an operation signal for a P-range switch 52 that operates switching to the P-range, and an operation signal for the Not P-range switch 53 that operates switching to the Not P-range. The range selected by the operation of the P-range switch 52 or the Not P-range switch 53 is displayed on a range display portion 54 provided in an installment panel (not shown).

Next, the configuration of the SR motor 30 is described with reference to FIGS. 3 and 4. The SR motor 30 is a motor with a stator 31 and a rotor 41 each having a salient pole structure. The SR motor 30 requires no permanent magnet and has a simple structure.

Figure 4:
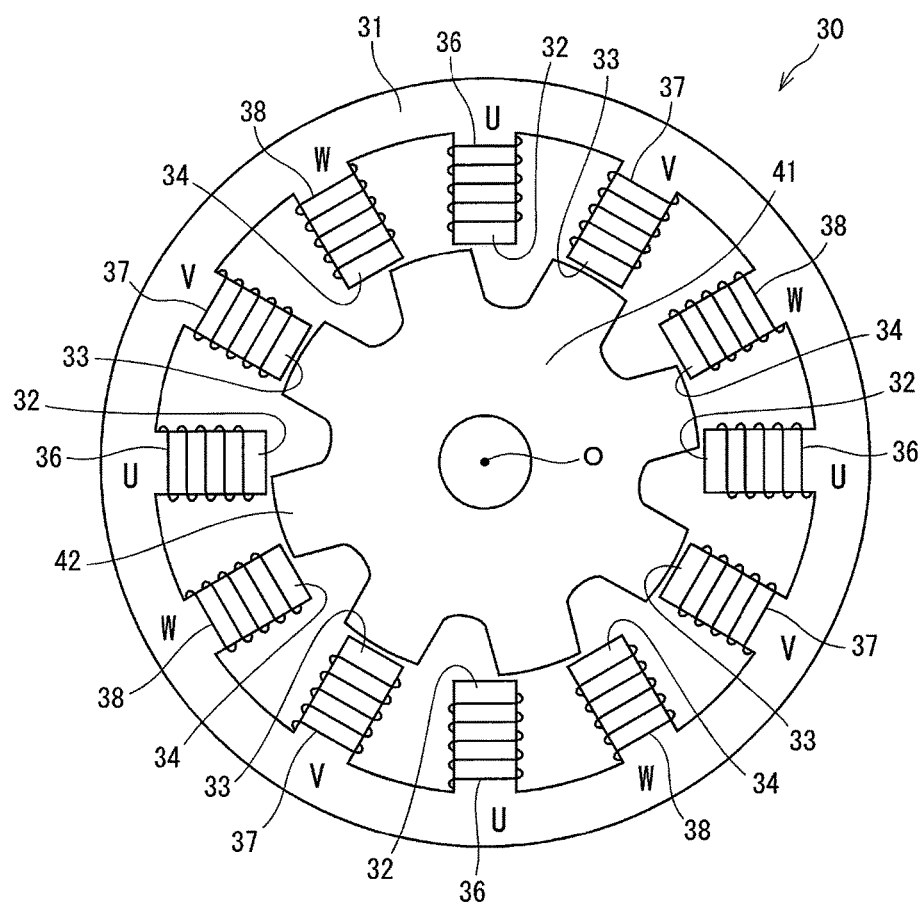
FIG. 4 is a view illustrating a configuration of an SR motor.

As shown in FIG. 4, the stator 31 and the rotor 41 are provided concentrically with respect to a central shaft O. Twelve salient poles 32, 33, 34 are formed on the inner periphery of the stator 31 at regular intervals of 30° in a peripheral direction. Eight salient poles 42 are formed on the outer periphery of the rotor 41 at regular intervals of 45° in the peripheral direction. A ratio of the number of salient poles of the stator 31 to the number of salient poles of the rotor 41 is set to "3 to 2." Accompanied by rotation of the rotor 41, the salient poles 42 of the rotor 41 face the salient poles 32, 33, 34 of the stator 31 in sequence via a minute gap.

A U-phase winding 36, a V-phase winding 37, and a W-phase winding 38 are respectively wound around the salient poles 32, 33, 34 of the stator 31. In other words, numeral 32 denotes the salient pole wound with the U-phase winding 36, numeral 33 denotes the salient pole wound with the V-phase winding 37, and numeral 34 denotes the salient pole wound with the W-phase winding 38.

Figure 3:
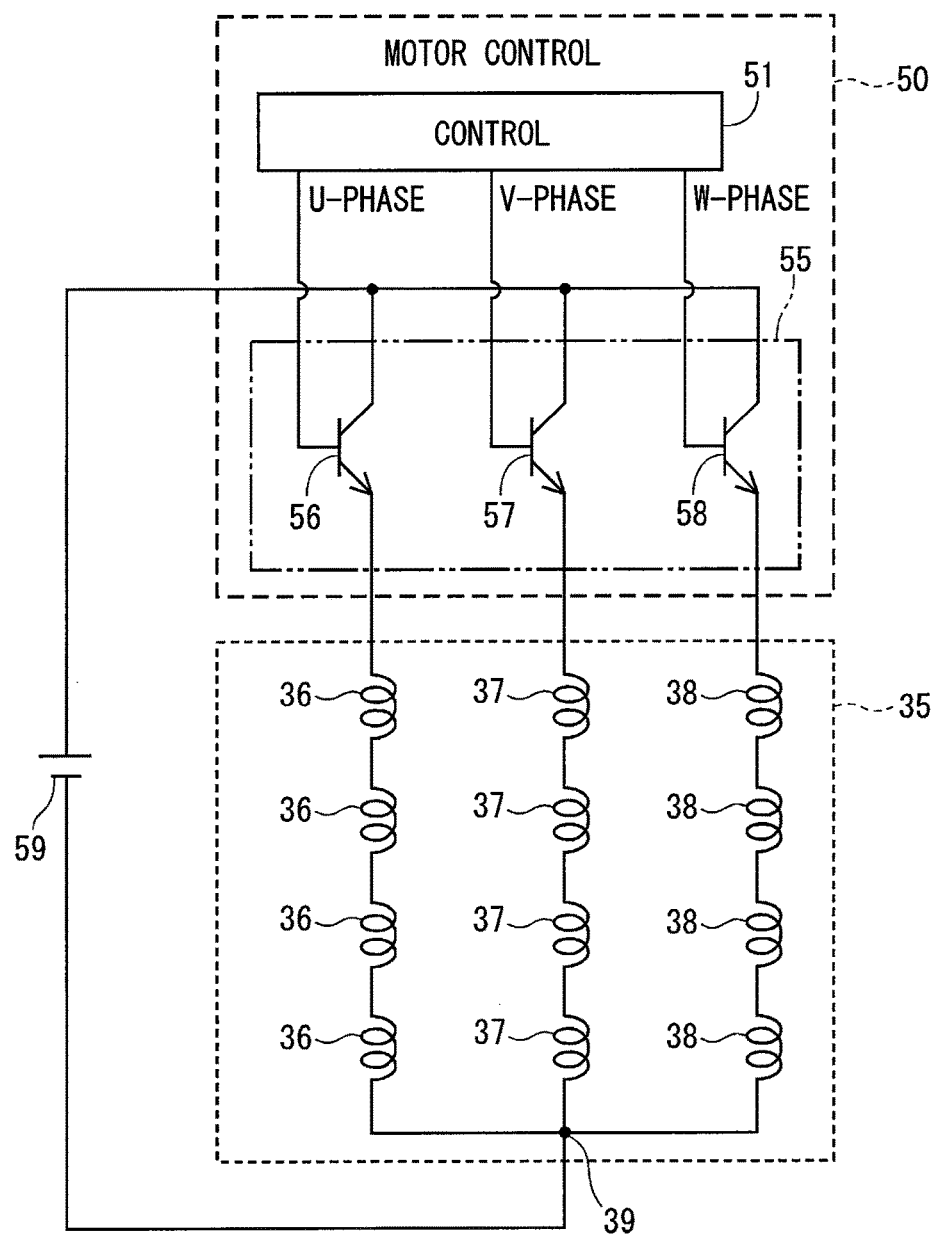
FIG. 3 is a schematic circuit configuration diagram of the motor control apparatus.

As shown in FIG. 3, four U-phase windings 36, four V-phase windings 37, and four W-phase windings 38 are each connected in series, and a total of 12 phase windings 36, 37, 38 is Y-connected at a neutral point 39 to constitute a three-phase winding set 35. Corresponding to this, the three salient poles 32, 33, 34 of the stator 31 are grouped into one set, and four sets are sequentially disposed in the peripheral direction.

The three-phase windings 36, 37, 38 are energized from the drive circuit 55 by a battery 59, which is a power source and mounted in the vehicle. Hereinafter, energizing the windings 36, 37, 38 of the stator 31 of the SR motor 30 is simply referred to as "energizing the SR motor 30." Further, energizing windings of any two phases out of the three-phase windings 36, 37, 38 is simply referred to as "energizing two phases."

The circuit configuration example of the drive circuit 55 shown in FIG. 3 is a circuit configuration of a unipolar drive system in which switching elements 56, 57, 58 such as transistors are provided in respective phases. However, there may be employed a circuit configuration in a bipolar drive system in which two switching elements are provided in each phase. The controller 51 controls the ON/OFF of each of the phase switching elements 56, 57, 58 of the drive circuit 55.

Subsequently, a configuration to detect the rotational position of the rotor 41 is described with reference to FIGS. 5 and 6.

Figure 5:
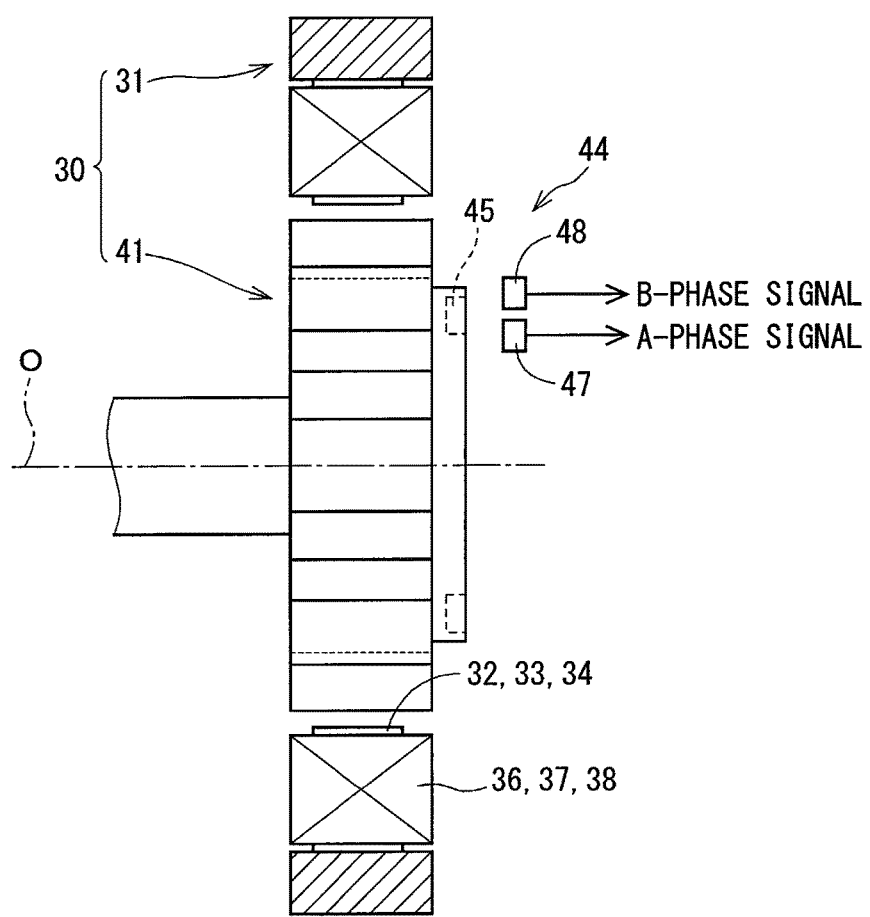
FIG. 5 is a view of a rotor of the SR motor seen in a radial direction.

As shown in FIG. 5, the encoder 44 of magnetic type is provided in the SR motor 30. The encoder 44 is configured of a rotary magnet 45 having an annular shape, magnetic sensors 47, 48 such as hall ICs, and the like. In the rotary magnet 45, N-poles and S-poles are alternately magnetized at regular pitches in a circumferential direction, and the rotary magnet 45 is concentrically fixed to the side surface of the rotor 41.

The magnetic sensors 47, 48 are disposed in positions facing the rotary magnet 45. The magnetic sensors 47, 48 respectively output an A-phase signal and a B-phase signal based on magnetic poles of the rotary magnet 45 which are in the facing positions.

In the present embodiment, settings are made such that each of the A-phase magnetic sensor 47 and the B-phase magnetic sensor 48 output a high-level value "Hi" when facing the N-pole, and outputs a low-level value "Lo" when facing the S-pole.

Figure 6:
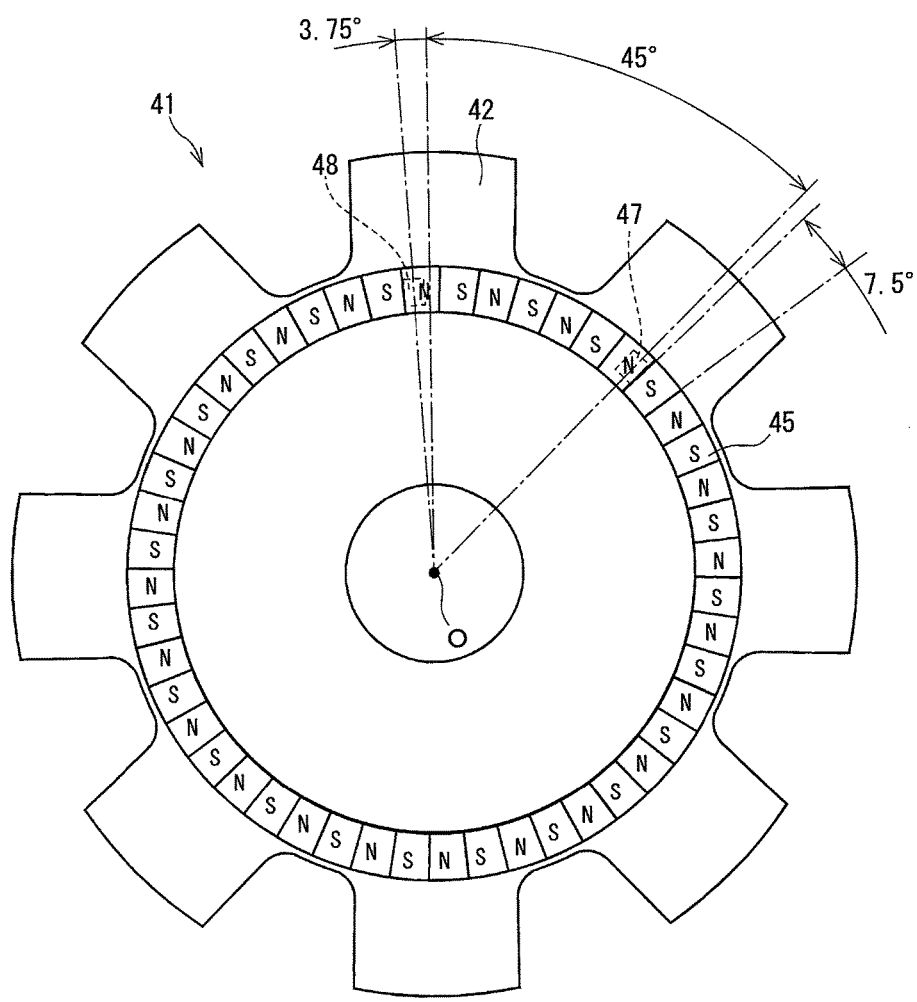
FIG. 6 is a schematic view of a rotary magnet.

As shown in FIG. 6, a total of 48 (24 pairs of) N-poles and S-poles of the rotary magnet 45 is provided, and a magnetizing pitch between the N-pole and the S-pole is set to 7.5°. This magnetizing pitch (7.5°) is set the same as an angle of rotation of the rotor 41 for each excitation of the SR motor 30.

The A-phase magnetic sensor 47 and the B-phase magnetic sensor 48 are disposed so as to be shifted from each other by 48.75°, which is an angle obtained by adding 45° as the interval between the salient poles 42 of the rotor 41 and 3.75° corresponding to one half of the magnetizing pitch of the rotary magnet 45.

Accompanied by rotation of the rotor 41, the magnetic sensors 47, 48 respectively output the A-phase signal and the B-phase signal to the controller 51 of the motor control apparatus 50 at predetermined angle intervals (referring to FIG. 1). During normal drive of the SR motor 30, the controller 51 counts the rising and falling edges of the A-phase signal and the B-phase signal, and switches the energized phase in accordance with the count values, to rotationally drive the SR motor 30. The motor driving method based on count values of the encoder 44 is a known technique, and hence a detailed description thereof is omitted.

Since the count values of the encoder 44 are stored into a RAM of the controller 51, for example when an ignition power source is turned off, the stored data of the count values disappears. Therefore, after the next power-on, it is necessary to perform an initial position learning process for associating the count values of the encoder 44 with an actual rotational position of the rotor 41 to learn the correspondence between the count values and the energized phase.

Hereinafter, the initial position learning process specific to the present embodiment is described.

The motor control apparatus 50 of the present embodiment learns the initial position of the rotor 41 based on the A-phase signal and the B-phase signal acquired from the encoder 44 in a state where two phases have been energized out of the three phases of the SR motor 30 during initial drive after power-on.

First, a position in which the rotor 41 becomes stable in the initial drive by two-phase energization is described with reference to FIGS. 7 to 10. In the following description, two phases, the U-phase and the V-phase, are assumed to be energized.

Figure 7:
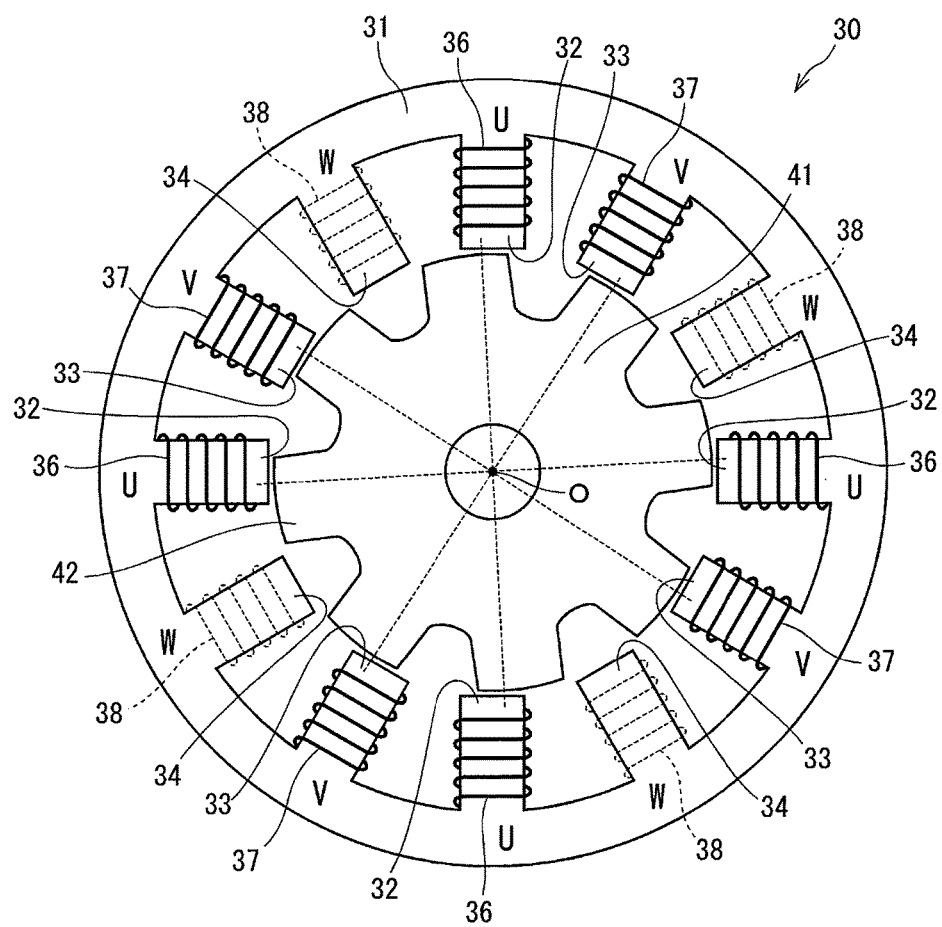
FIG. 7 is a view of the SR motor when a rotor rotational position is a two-phase facing position.
Figure 9:
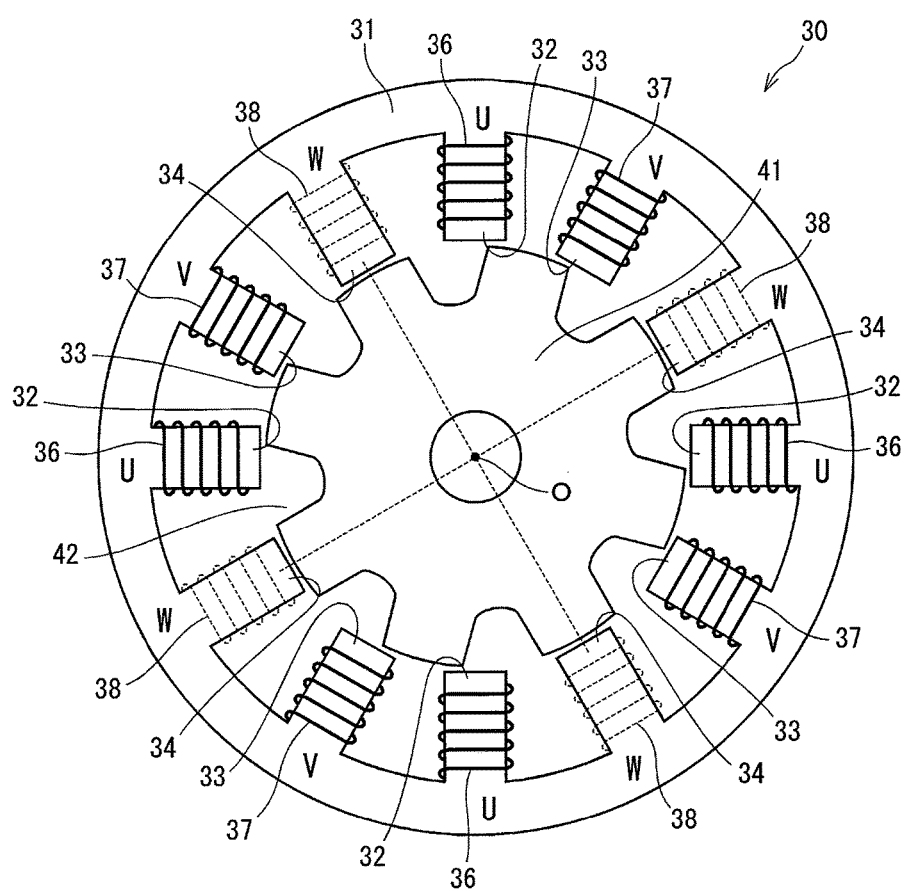
FIG. 9 is a view of the SR motor when the rotor rotational position is a one-phase facing position.

Each of FIGS. 7 and 9 shows the rotational position of the rotor 41 in the state where the U-phase and the V-phase have been energized, with respect to FIG. 4. The windings 36, 37 of the U-phase and the V-phase as energized phases are illustrated by thick solid lines, and the winding 38 of the W-phase as a non-energized phase is illustrated by a thin broken line. Further, a broken line passing through a center point O shows a direction in which each of the salient poles 32, 33, 34 of the stator 31 faces the salient pole 42 of the rotor 41.

Figure 8:
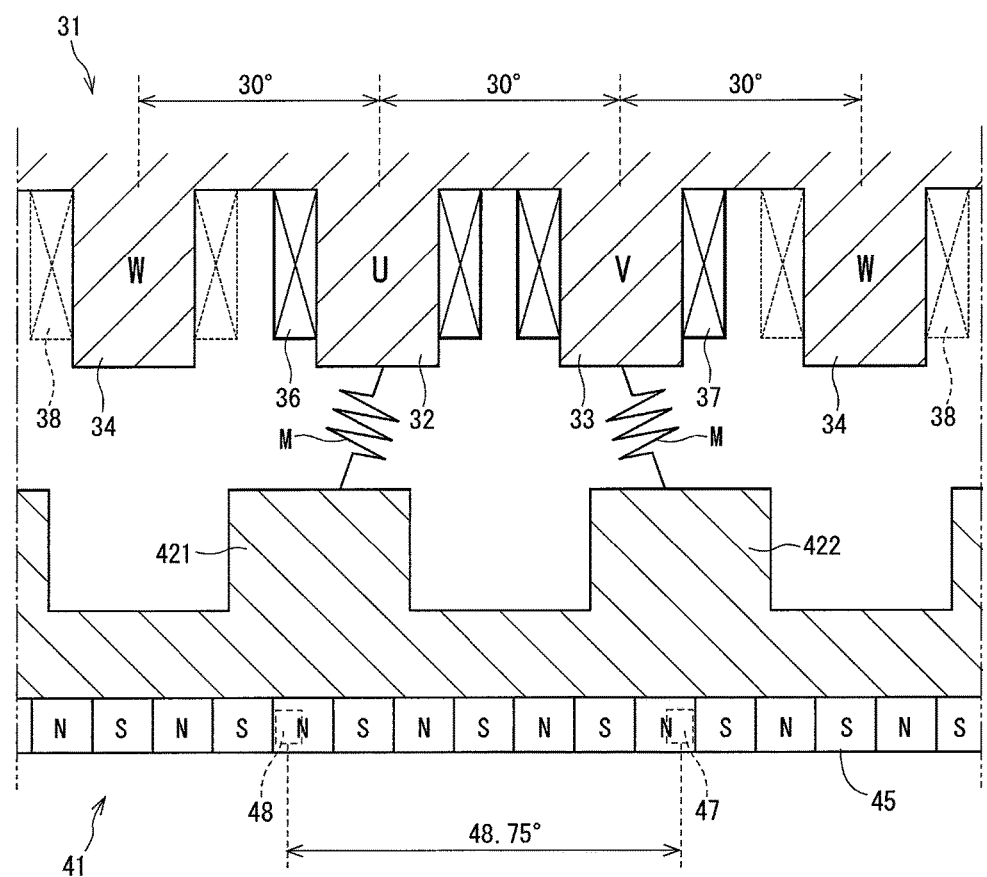
FIG. 8 is a schematic view showing the facing relation between the stator and the rotor in the two-phase facing position.
Figure 10:
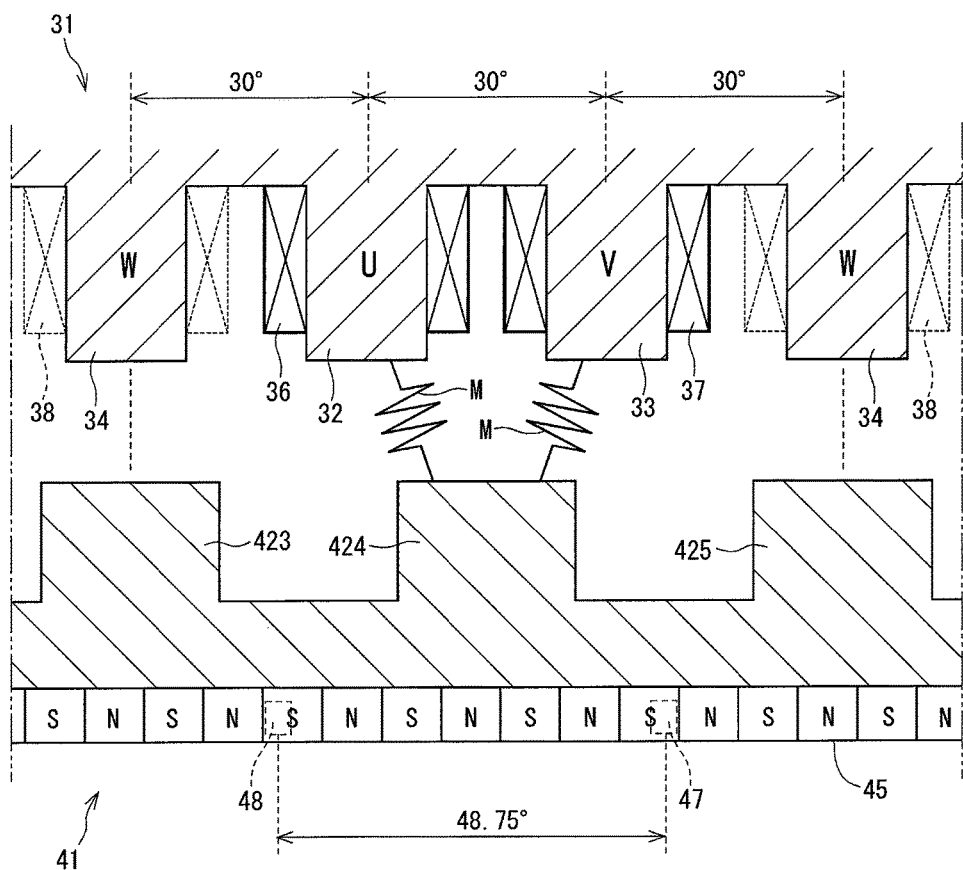
FIG. 10 is a schematic view showing the facing relation between the stator and the rotor in the one-phase facing position.

Each of FIGS. 8 and 10 is a schematic view obtained by developing peripherally a part (a range of about 110° to 120°) of the SR motor 30, and shows the positional relation between the salient poles 32, 33, 34 of the stator 31 and the salient poles 42 of the rotor 41, and the positional relation between the magnetic pole of the rotary magnet 45 (referring to FIG. 6) and the magnetic sensors 47, 48. For the sake of description, each of the multiple salient poles 42 of the rotor 41 is distinguished by adding a figure to be a third digit of the numeral.

Similarly to FIGS. 7 and 9, the windings 36, 37 of the U-phase and the V-phase as the energized phases are illustrated by thick solid lines, and the winding 38 of the W-phase as the non-energized phase is illustrated by a thin broken line. Further, a coupling M formed by magnetic suction force is schematically shown.

In the position shown in FIGS. 7 and 8, two adjacent salient poles 421, 422 of the rotor 41 face the salient poles 32, 33 of the two energized phases (U-phase, V-phase) of the stator 31. At this point, the salient pole 421 of the rotor 41 is magnetically coupled with the U-phase salient pole 32 of the stator 31, and the salient pole 422 adjacent to the salient pole 421 is magnetically coupled with the V-phase salient pole 33. This rotational position of the rotor 41 is referred to as a "two-phase facing position."

In the two-phase facing position, the A-phase sensor 47 and the B-phase sensor 48 both face the N-pole of the rotary magnet 45. Thus, "Hi" is outputted as each of the values of the A-phase signal and the B-phase signal. This case corresponds to an example of the case where the both values of the A-phase signal and the B-phase signal are one of Hi and Lo (or in the first state).

In the position shown in FIGS. 9 and 10, one salient pole 423 (or 425) of the rotor 41 faces the salient pole 34 of one non-energized phase (W-phase) of the stator 31. Specifically, the salient poles 423, 425, disposed in every other position in the peripheral direction of the rotor 41, face the W-phase salient poles 34 of the stator 31. The salient pole 424 between the salient poles 423, 425 is located midway between the U-phase salient pole 32 and the V-phase salient pole 33, and magnetically coupled with both the U-phase salient pole 32 and the V-phase salient pole 33. This rotational position of the rotor 41 is referred to as a "one-phase facing position."

In the one-phase facing position, the A-phase sensor 47 and the B-phase sensor 48 both face the S-pole of the rotary magnet 45. Thus, "Lo" is outputted as each of the values of the A-phase signal and the B-phase signal. This case corresponds to an example of the case where the both values of the A-phase signal and the B-phase signal are the other of Hi and Lo (or in the second state).

Next, the initial position learning process conducted by the controller 51 is described with reference to time charts (a) to (c) of FIG. 11 and a flowchart of FIG. 12.

Figure 11:
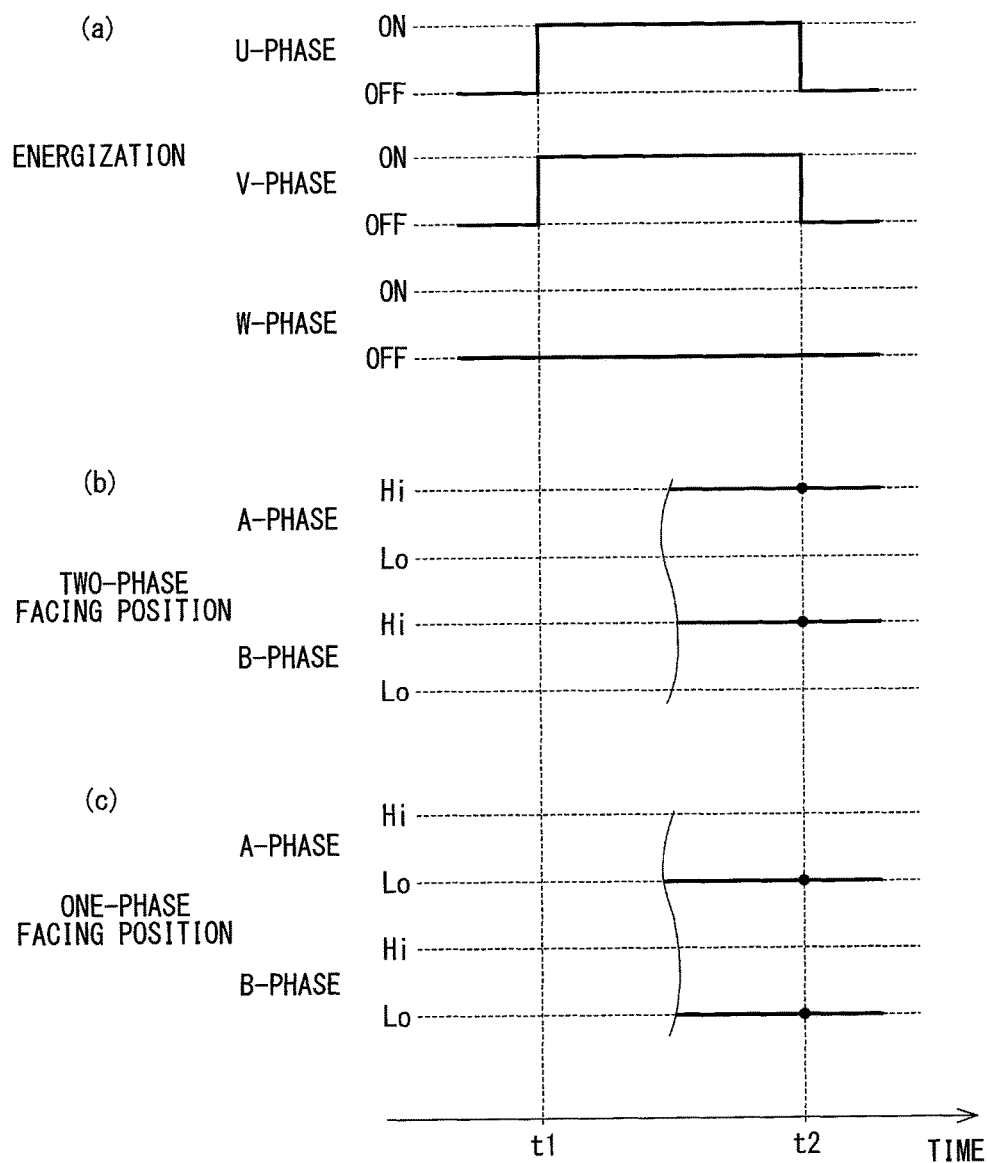
FIG. 11 is a time chart for an initial position learning process according to one embodiment.

A horizontal axis that is common among (a) to (c) of FIG. 11 shows time. A vertical axis of (a) of FIG. 11 shows turning-on/off of each phase, and vertical axes of (b) and (c) of FIG. 11 show Hi/Lo values of the A-phase signal and the B-phase signal.

Figure 12:
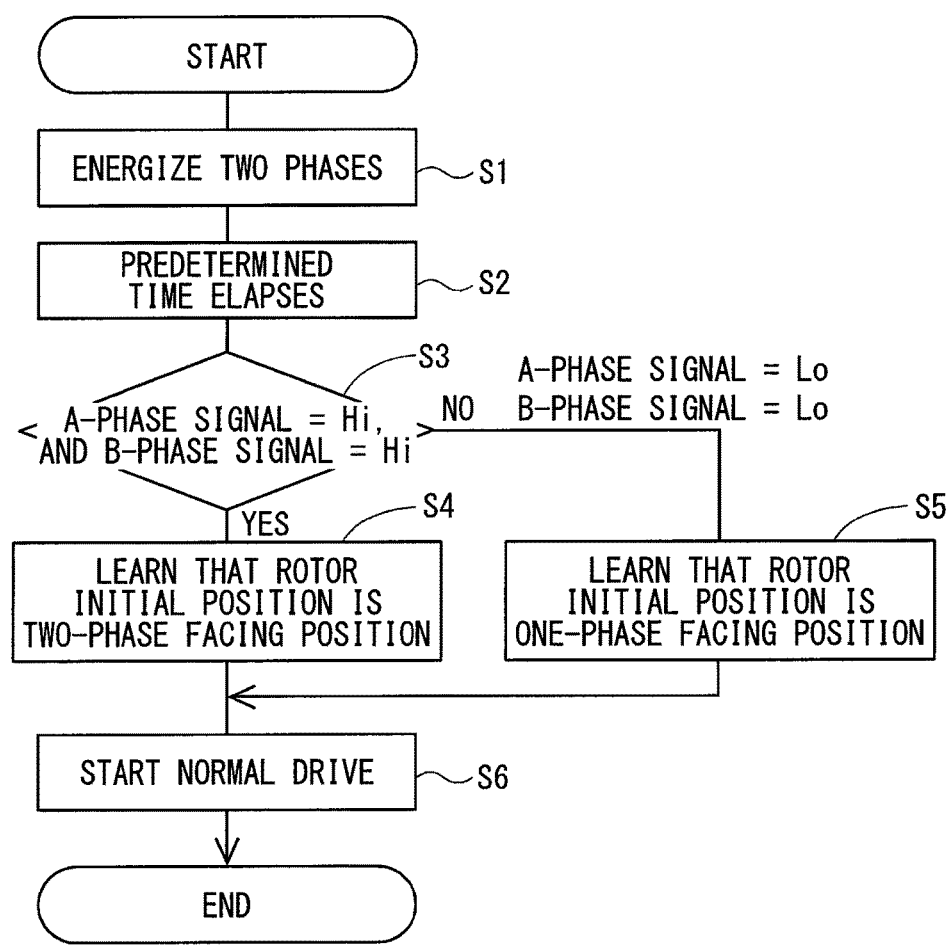
FIG. 12 is a flowchart for the initial position learning process according to one embodiment.

Further, in the description of the flowchart of FIG. 12, symbol "S" denotes a step (or also called a section).

In (a) to (c) of FIG. 11, the initial position learning process is started at a time t1 and completed at a time t2. A stop position of the rotor 41 at the time t1 is unclear. When the energization of the two phases, the U-phase and the V-phase, is started at the time t1, the SR motor 30 starts initial drive. During the initial drive, the rotor 41 rotates in either direction, or does not rotate at all. By the time t2, the rotor 41 becomes stable in the initial position of either the two-phase facing position or the one-phase facing position.

The A-phase signal and the B-phase signal of (b) and (c) FIG. 11 show values after the initial position of the rotor 41 has become stable. As shown in (b) of FIG. 11, when the rotor 41 becomes stable in the two-phase facing position, the values of the A-phase signal and the B-phase signal both become Hi. In contrast, as shown in (c) of FIG. 11, when the rotor 41 becomes stable in the one-phase facing position, the values of the A-phase signal and the B-phase signal both become Lo.

The controller 51 completes the initial drive by the two-phase energization at the time t2, and learns whether the initial position of the rotor 41 is the two-phase facing position or the one-phase facing position based on the values of the A-phase signal and the B-phase signal at the time t2.

As shown in FIG. 12, in S1 of the initial position learning process, two phases out of the three phases of the SR motor 30 are energized for the initial drive. The time of conducting S1 corresponds to the time t1 in (a) to (c) of FIG. 11. At this time, for example when disconnection of the W-phase has been found by another detection means, the two phases, U-phase and V-phase being not disconnected, are inevitably energized. When every phase is normal, any two phases may be selected. An example of energizing two phases, the U-phase and the V-phase, is assumed here.

In S2, the lapse of a predetermined time is waited. The predetermined time in S2 corresponds to the time from the time t1 to the time t2 in (a) to (c) of FIG. 11.

In determination of S3 conducted at the time t2, when the A-phase signal and the B-phase signal are both Hi (S3: YES), the controller 51 learns that the initial position of the rotor 41 is the two-phase facing position (S4). In contrast, when the A-phase signal and the B-phase signal are both Lo (S3: NO), the controller 51 learns that the initial position of the rotor 41 is the one-phase facing position (S5).

In S6, the normal drive of the SR motor 30 is started with the learned initial position set as a reference. In the normal drive, based on count values of output signals of the encoder 44, the angle of rotation of the rotor 41 from the initial position is detected, to calculate the current rotational position of the rotor 41. Based on the rotational position of the rotor 41, the controller 51 decides the energized phase so as to sequentially switch the energized phase, and makes an instruction to the drive circuit 55. The drive circuit 55 performs switching operation so as to energize the energized phase decided by the controller 51.

For example when the W-phase is disconnected, the two phases, the U-phase and the V-phase, are alternately energized to rotate the SR motor 30. Appropriately adjusting the energization timing and an energized amount enables the SR motor 30 to be normally driven by the two-phase energization.

The motor control apparatus 50 of the present embodiment energizes two phases out of the three phases during the initial drive after power-on in the drive control of the SR motor 30. When two adjacent salient poles 42 of the rotor 41 and the salient poles of the two energized phases of the stator 31 are in positions facing each other, the motor control apparatus 50 learns each of the positions as the initial position. This is similar to the conventional art of Patent Literature 1.

The conventional art of Patent Literature 1 gives no consideration of using "the one-phase facing position where one salient pole 42 of the rotor 41 faces the salient pole of one non-energized phase of the stator 31" for learning. The conventional art of Patent Literature 1 conducts two-stage drive where one phase is first energized and two phases are then energized, or conducts product assembly by using a spring or the like, so as to certainly guide the rotor 41 to the two-phase facing position. This might cause the initial drive to take time or applicable products to be limited.

The present embodiment actively employs the learning that the one-phase facing position is set as the initial position in addition to the learning that the two-phase facing position is set as the initial position. After the initial drive by the two-phase energization, the rotor 41 certainly becomes stable in either the two-phase facing position or the one-phase facing position. Then, the determination can be easily made based on whether the both values of the A-phase signal and the B-phase signal of the encoder 44 are Hi or Lo. It is thus possible to easily learn the initial position of the rotor 41 at the start of activation without the two-stage drive or the devised product assembly as in the conventional art.

According to related arts disclosed in Japanese Patent No. 3800529 and Japanese Patent No. 4936069, since three phases are energized through one complete cycle during initial drive, energization might take time to increase current consumption, and further, it might not be possible to learn the initial position when one phase is disconnected.

In contrast, in the present embodiment, since two phases out of the three phases are energized in learning the initial position, it may be possible to learn the initial position even when one phase is disconnected. Accordingly, for example when the present embodiment is applied to the range switching apparatus of the vehicle, the range can be switched during evacuation running.

(Other Embodiments)

(1) In the above embodiment, settings are made such that the magnetic sensors 47, 48 output "Hi" when facing the N-pole, and output "Lo" when facing the S-pole. In contrast, a configuration is assumed where arrangement of the magnetic poles of the rotary magnet 45 is the same as that in FIG. 6, and settings are made such that the magnetic sensors 47, 48 output "Lo" when facing the N-pole, and output "Hi" when facing the S-pole. In this configuration, in the initial position learning process, the initial position of the rotor 41 is determined to be the two-phase facing position when the A-phase signal and the B-phase signal are both Lo, and the initial position of the rotor 41 is determined to be the one-phase facing position when the A-phase signal and the B-phase signal are both Hi. Further, when the arrangement of the magnetic poles of the rotary magnet 45 is made opposite to that in FIG. 6 and the output values of the magnetic sensors 47, 48 are set the same as those in the above embodiment, a similar determination to the above is made.

As thus described, the determination reference in the initial position learning process may be changed as appropriate in accordance with the arrangement of the magnetic poles of the rotary magnet 45 and the output settings for the magnetic sensors 47, 48.

(2) The motor is not restricted to the SR motor, but may be another type of brushless synchronous motor so long as the motor is a blushless synchronous motor that detects the rotational position of the rotor based on count values of output signals of the encoder and sequentially switches the energized phase.

Further, the number of salient poles of the stator and the number of salient poles of the rotor are not restricted to 12 and 8 as illustrated in the above embodiment, but may be any numbers.

(3) As is known, the encoder may output a Z-phase signal as a reference signal in addition to the A-phase signal and the B-phase signal. Further, the encoder is not restricted to a magnetic encoder, but there may be used an optical encoder, a blush encoder, and the like.

(4) The motor may be configured of multiple winding sets, and multiple systems of drive circuits in the motor control apparatus may be provided in accordance with the number of winding sets. Accordingly, even when part of the drive circuits or winding sets is broken down, the motor can be continuously driven by using another normal drive circuit and winding set, to thereby improve the reliability.

(5) The range switching apparatus, to which the motor control apparatus of the present disclosure is applied, is not restricted to the configuration to switch two ranges, the P-range and the Not P-range, as in the above embodiment. For example, the range switching apparatus may be configured to switch a range switching valve of the automatic transmission and a manual valve in conjunction with rotating operation of the detent lever, and switch each of ranges such as P, R, N, and D of the automatic transmission.

(6) The motor control apparatus of the present disclosure is not restrictively applied to the range switching apparatus of the vehicle, but is applicable to a variety of actuators that drive a blushless synchronous motor such as the SR motor.

According to the present disclosure, it may be possible to provide a variety of motor control apparatus that is applied to an actuator including a motor and an encoder, and drives the motor.

The motor includes: a stator having multiple salient poles, wound with the three-phase windings, on an inner periphery; and a rotor having multiple salient poles on an outer periphery. Accompanied by rotation of the rotor, the encoder outputs an A-phase signal and a B-phase signal, which take either Hi or Lo, at a predetermined angle interval.

The motor control apparatus detects a rotational position of the rotor based on count values of the output signals of the encoder during normal drive, and sequentially switches an energized phase.

The motor may be a switched reluctance motor. Further, this motor control apparatus may be applied to a range switching apparatus of an automatic transmission of the vehicle as the actuator, for example. The motor may be used as a drive source for switching a range in the range switching apparatus.

A motor control apparatus according to one example of the present disclosure includes a controller and a drive circuit.

The controller learns an initial position of the rotor on the basis of the A-phase signal and the B-phase signal acquired from the encoder in the state where two phases have been energized out of three phases during initial drive after power-on. The controller decides an energized phase on the basis of a rotational position of the rotor during normal drive after the initial drive.

The drive circuit performs switching operation so as to energize the energized phase decided by the controller.

The controller learns the following in learning the initial position.

When values of the A-phase signal and the B-phase signal are both one of Hi and Lo (corresponding to a first state), the initial position of the rotor is a "two-phase facing position" where two adjacent salient poles of the rotor face the salient poles of two energized phases of the stator.

When values of the A-phase signal and the B-phase signal are both the other of Hi and Lo (corresponding to a second state), the initial position of the rotor is a "one-phase facing position" where one salient pole of the rotor faces the salient pole of one non-energized phase of the stator.

In the motor, a ratio of the number of salient poles of the stator to the number of salient poles of the rotor may be set to "3 to 2." For example, the number of salient poles of the stator is set to 12, and the number of salient poles of the rotor is set to 8.

According to the present disclosure, it may be possible to learn that the initial position of the rotor is the two-phase facing position or the one-phase facing position based on values of the A-phase signal and the B-phase signal at the time of energizing two phases out of three phases. Hence it may be possible to easily learn the initial position of the rotor at the start of activation without the two-stage drive or the devised product assembly as in the conventional art.

Further, in the present disclosure, since two phases out of the three phases are energized in learning the initial position, the initial position can be learned even when one phase is disconnected. Accordingly, for example when the present embodiment is applied to the range switching apparatus of the vehicle, the range can be switched during evacuation running.

It is noted that a flowchart or the processing of the flowchart in the present application includes multiple steps (also referred to as sections), each of which is represented, for instance, as S1. Further, each step can be divided into several sub-steps while several steps can be combined into a single step.

While various embodiments, configurations, and aspects of the motor control apparatus according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:
1. A motor control apparatus which is applied to an actuator provided with a motor that includes a stator having a plurality of salient poles, wound with three-phase windings, on an inner periphery, and a rotor having a plurality of salient poles on an outer periphery, and an encoder that outputs, at a predetermined angle interval, an A-phase signal and a B-phase signal that take either Hi or Lo accompanied by rotation of the rotor, the motor control apparatus driving the motor, the motor control apparatus comprising:

a controller that learns an initial position of the rotor based on the A-phase signal and the B-phase signal acquired from the encoder in a state where two-phases out of three phases have been energized during initial drive after power-on, and also decides an energized phase based on a rotational position of the rotor during normal drive after the initial drive; and a drive circuit that performs switching operation to energize the energized phase, which is decided by the controller, wherein:

the controller learns that, in learning the initial position, the initial position of the rotor is a two-phase facing position in which two adjacent salient poles of the rotor face salient poles of two energized phases of the stator when values of the A-phase signal and the B-phase signal are in a first state of both being Hi or both being Lo, the initial position of the rotor is a one-phase facing position in which one salient pole of the rotor faces a salient pole of one non-energized phase of the stator when the values of the A-phase signal and the B-phase signal are in a second state of both being Hi or both being Lo;

the encoder is configured to include a rotary magnet having an annular shape and a magnetic sensor of a hall IC; and a magnetizing pitch of the rotary magnet is set to 7.5° between N-pole and S-pole.

2. The motor control apparatus according to claim 1, wherein:

in the motor, a ratio of a number of salient poles of the stator and a number of salient poles of the rotor is set to 3:2.

3. The motor control apparatus according to claim 1, wherein:

the motor is provided by a switched reluctance motor.

4. The motor control apparatus according to claim 1, wherein:

the actuator is provided by a range switching apparatus of an automatic transmission; and the motor is used as a drive source that switches a range of the range switching apparatus.

5. The motor control apparatus according to claim 1, wherein:

after the power-on, the two-phases out of the three phases are energized during the initial drive and the energized two-phases are unchanged during the initial drive.

* * * * *